United States Patent
Waggoner et al.

(10) Patent No.: US 12,169,899 B2
(45) Date of Patent: Dec. 17, 2024

(54) CLOTH MODELING USING QUAD RENDER MESHES

(71) Applicant: Pixar, Emeryville, CA (US)

(72) Inventors: Christine Waggoner, Albany, CA (US); Fernando Ferrari De Goes, Kensington, CA (US)

(73) Assignee: Pixar, Emeryville, CA (US)

( * ) Notice: Subject to any disclaimer, the term of this patent is extended or adjusted under 35 U.S.C. 154(b) by 62 days.

(21) Appl. No.: 17/819,212

(22) Filed: Aug. 11, 2022

(65) Prior Publication Data
US 2024/0054727 A1 Feb. 15, 2024

(51) Int. Cl.
*G06T 17/20* (2006.01)
*G06T 15/00* (2011.01)

(52) U.S. Cl.
CPC .......... *G06T 17/205* (2013.01); *G06T 15/00* (2013.01); *G06T 2200/24* (2013.01); *G06T 2210/16* (2013.01)

(58) Field of Classification Search
CPC ... G06T 17/205; G06T 17/20; G06T 2200/24; G06T 2210/16; G06T 15/04
See application file for complete search history.

(56) References Cited

U.S. PATENT DOCUMENTS

| | | | |
|---|---|---|---|
| 8,654,121 B1 * | 2/2014 | Yu | G06T 17/205 345/428 |
| 8,704,823 B1 | 4/2014 | Waggoner et al. | |
| 10,861,233 B1 * | 12/2020 | De Goes | G06T 17/205 |
| 10,984,581 B2 | 4/2021 | De Goes | |
| 2006/0164415 A1 * | 7/2006 | Smith | G06T 17/205 345/423 |
| 2007/0024632 A1 * | 2/2007 | Couture-Gagnon | G06T 19/00 345/581 |
| 2020/0184705 A1 * | 6/2020 | Li | G06T 19/20 |
| 2023/0076939 A1 * | 3/2023 | Mammou | G06T 9/001 |

OTHER PUBLICATIONS

M. Botsch and L. Kobbelt, "A Remeshing Approach to Multiresolution Modeling", In Proc. of the Eurographics/ACM SIGGRAPH Symp. on Geometry Processing, 2004, pp. 185-192 <https://www.graphics.rwth-aachen.de/media/papers/remeshing1.pdf>.

* cited by examiner

*Primary Examiner* — King Y Poon
*Assistant Examiner* — Vincent Peren
(74) *Attorney, Agent, or Firm* — Patterson + Sheridan, LLP

(57) ABSTRACT

Embodiments provide for three-dimensional cloth modeling are provided. A first mesh comprising a plurality of faces defined by a plurality of edges is accessed, and a render mesh is generated using quadrangulated tessellation of the first mesh, where the render mesh comprises quad faces. One or more attributes of the plurality of faces of the first mesh are transferred to one or more of the quad faces of the render mesh using a stochastic transfer operation. The render mesh is displayed via a graphical user interface (GUI).

20 Claims, 9 Drawing Sheets

CLOTH MODELING USING QUAD RENDER MESHES

BACKGROUND

Three-dimensional (3D) computer graphics have seen increasing use in a variety of multimedia, particularly in movies and shows. For example, computer graphics have been used as the primary medium (e.g., where the entire media uses computer-generated graphics), as well as for supplementary visuals (e.g., to add characters or special effects in live-action multimedia). A major recurring difficulty in computer graphics relates to cloth. Often, to provide realistic or visually-appealing cloth (e.g., clothing on characters), some level of cloth simulation is used to replicate the movement of the material. However, such simulation generally relies on very dense meshes to provide satisfactory results. Manually creating such dense meshes for simulation is difficult or impossible, and makes changing or modifying the mesh prohibitive.

Further, the rendering process for cloth materials (e.g., the process of generating output images depicting the 3D model) introduces substantial difficulties in conventional solutions. For example, in a similar manner to simulation meshes, satisfactory rendering generally relies on very dense render meshes which are difficult or impossible for designers and modelers to work with. Further, due to the nature of cloth materials, conventional approaches for cloth generation frequently result in significant rendering artifacts (e.g., imperfections in the output image), such as visible striations in the material.

SUMMARY

According to one embodiment presented in this disclosure, a method is provided. The method includes: accessing a first mesh comprising a plurality of faces defined by a plurality of edges; generating a render mesh using quadrangulated tessellation of the first mesh, wherein the render mesh comprises quad faces; transferring one or more attributes of the plurality of faces of the first mesh to one or more of the quad faces of the render mesh using a stochastic transfer operation; and displaying the render mesh via a graphical user interface (GUI).

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
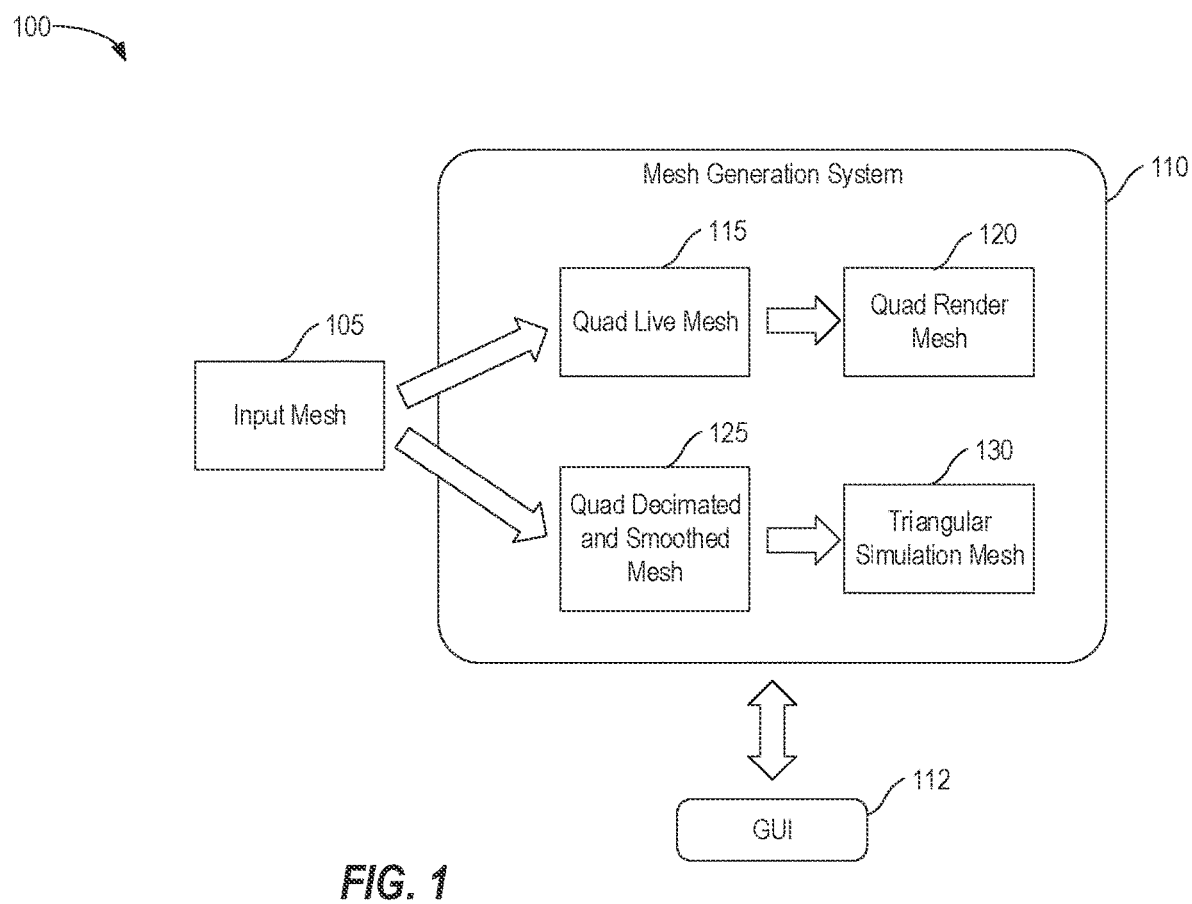
FIG. 1 depicts an example system for generating output meshes based on input meshes.

Embodiments of the present disclosure provide improved cloth mesh generation, simulation, and rendering.

In some embodiments, modelers (also referred to as designers or artists in some aspects) interact primarily with a low-resolution quad-dominant mesh, which defines the garment or cloth look while facilitating rigging and simulation. In one embodiment, the computer system then converts this coarse input model into a mesh for simulation (e.g., a triangulated mesh), also referred to as a simulation mesh in some aspects. In some conventional systems, triangulated meshes are also used for rendering. However, rendering cloth materials made from triangulated meshes frequently results in substantial rendering artifacts. In some aspects of the present disclosure, therefore, the computer system can generate a quadrangulated subdivision surface for rendering.

In some embodiments of the present disclosure, the computing system uses a set of procedural routines to generate render meshes based on low-resolution input meshes, such as by applying fold-over thickness, refining the mesh, and inserting seams. In some embodiments, a suite of algorithms and techniques are further introduced to enable transferring of input attributes onto the derived meshes, from the input mesh. As discussed in more detail below, these attribute transfer tools can include techniques such as using UV shells, face colors, crease edges, and/or vertex weights.

In some embodiments, an input mesh is processed to generate both a simulation mesh (which may be used to simulate the movements of the cloth or garment) and a render mesh (which may be used to render the output scene). In one embodiment, once the input (cloth) mesh is modeled (e.g., by a user or designer), the computing system generates the simulation mesh by defining a smooth baseline shape targeted by a tessellator (e.g., using a remeshing algorithm), such as by applying one or more subdivision steps. In some aspects, the remeshing algorithm used to tessellate the input mesh and create the simulation mesh involves alternating edge splits, collapses, and flips, followed by vertex relaxations. In some embodiments, a defined number of iterations (e.g., five iterations, or some other number which may be determined using experimentation) of these operations are used to produce high-quality triangle simulation meshes. In some embodiments, for splits and collapses during the tessellation process, the computing system sorts mesh edges into a priority queue based on the difference between the edge length and a target value. To enable adaptive resolution, the system may set the target value by interpolating minimum and maximum length values (e.g., using painted vertex weights). In some aspects, edge flips are performed sequentially for each edge whose sum of opposite angles is greater than pi, thus favoring Delaunay triangulations.

That is, in some embodiments, to tessellate the input mesh to create an output mesh, the system can apply N iterations (where N is a user-defined value) of tessellation, where each iteration first splits edges that are longer than a user-prescribed threshold, and then collapses edges that are shorter than another user-prescribed threshold. The system can then flip edges whose sum of opposite angles is greater than 180 degrees, and then relax vertices to the average of its neighbors projected back to the closest point of the original subdivided input mesh. As discussed above, this tessellation may be performed as a triangulated tessellation to generate the simulation mesh.

In some embodiments of the present disclosure, in addition to generating the simulation mesh, the system can also generate a render mesh based on the input mesh. In at least one aspect, the render mesh is quadrangular (e.g., it is a quadrangulated mesh or a quad mesh). That is, the faces of the render mesh may be quads (four-sided polygons). In many conventional systems, the render mesh is triangulated (with triangular faces). Though triangular meshes are generally simple to create, they also result in significant rendering artifacts, as compared to the quadrangular approaches disclosed herein. In one embodiment, the render mesh is generated using quadrangulated tessellations (e.g., using the tessellation process described above, but to generate quad faces rather than triangular) defining Catmull-Clark subdivision surfaces. In some embodiments, the original input mesh (modeled by artists) may be quad-dominant (e.g., formed mostly by quads, but possibly containing some non-quad polygons). After running quadrangulated tessellation/Catmull-Clark subdivisions, each polygon is split into quads, thus forming a quadrangulated tessellation.

In some embodiments, to generate render meshes based on input meshes, the system uses a set of procedural rules to refine the input model through a stack of modeling and deformation operations. For example, in some aspects, artists or designers can author or create geometric seams in the render mesh by specifying edge sets in the input mesh, and then interactively editing seam parameters (such as thickness, normal offset, and left-right asymmetry). That is, rather than requiring the user to manually model cloth seams, the system can automatically generate them based on a set of input parameters. As another example, in some embodiments, the system can also make garments double-sided by extruding selected face sets adjacent to the input mesh boundaries, and offsetting corresponding vertices based on user prescribed weights. That is, rather than requiring the user manually model the depth or thickness of the cloth, the input mesh can be a flat surface, and the system can automatically create any desired thickness.

In some embodiments, a live preview of the procedural modifications can be provided, allowing artists to quickly iterate on the look of the cloth or garment. Once the preview is satisfactory, in some embodiments, the system can automatically complete the render mesh and/or simulation mesh by transferring any attributes available in the input mesh to the render mesh using a variety of transfer tools. As there is generally no one-to-one correspondence between the input mesh and the generated simulation mesh and render mesh (e.g., some or all of the faces, edges, and vertices in the output meshes do not directly correspond to any components of the input mesh), transferring such attributes can be difficult or impossible in conventional systems, In embodiments, the input mesh can be optionally decorated or labeled with various attributes, such as to define characteristics or features of the garment or cloth. In an embodiment, these attributes can include edge-specific attributes (e.g., assigning one or more attributes to specific edges in the mesh), vertex-specific attributes (e.g., assigning one or more attributes to specific vertices in the mesh), and/or face-specific attributes (e.g., assigning one or more attributes to specific faces in the mesh). In some embodiments, some or all of the attributes are used in the process of creating the simulation and render meshes. In some embodiments, some or all of the attributes are consumed by downstream processes (e.g., to specify fabric weights during simulation, to facilitate rendering of the mesh, or to affect how it appears when rendered).

In some embodiments, to transfer such attributes, the system can use techniques such as using subdivision stencils and/or using the tessellator to transfer the attributes. For example, each time the input mesh is tessellated (e.g., when an edge or face is duplicated or split into multiple edges or faces), the system can copy the attributes of the input component (e.g., of the edge or face being duplicated) and use them as attributes of the output component(s) (e.g., of the edges or faces in the new mesh). In at least one embodiment, the system may use spatial transfer (e.g., simply overlapping or aligning the input and output mesh, and copying attributes over based on their spatial locations), which may work well for some meshes having low geometric complexity. In some aspects, however, such approaches can result in sub-optimal or inaccurate attribute transfer for a variety of realistic cloth meshes.

In some embodiments, in addition to or instead of using such techniques, the system can use a stochastic transfer operation. As discussed in more detail below, the stochastic transfer operation may include sampling attributes densely over the input mesh, and reconstructing the attributes in the output mesh (e.g., the render mesh or simulation mesh) by counting projected samples per face on the output mesh. In one embodiment, to transfer edge sets, the system can first detect continuous edge chains within each set, construct a temporary face set for every chain side (e.g., a first set of faces for one side of the edge set and a second set of faces for the other side of the edge set), and then repeat the face set stochastic transfer in order to identify the relevant edges in the output mesh (e.g., edges that border or divide the projected face sets).

Aspects of the present disclosure can generally be used in a variety of stages of an animation production pipeline. For example, the system may be used after initial modeling (e.g., after the cloth meshes are created) to generate render meshes and/or simulation meshes used to produce the animation. The simulation mesh may then be used to simulate the cloth movement during the animation. Similarly, the render mesh may be used to produce the final render output (e.g., after the animation is complete). For example, the input mesh and/or simulation mesh may be animated, and the render mesh may be fit to the input mesh and/or simulation mesh to form the final output.

In these ways, embodiments of the present disclosure enable automated generation of output meshes based on input meshes, which can include creation of new geometry (e.g., seams and/or thickness) in the output mesh. This substantially reduces manual effort and improves the resulting output meshes. Further, by using stochastic attribute transfers and other techniques, the system is able to dynamically and automatically transfer attributes of the input mesh to the output mesh, substantially reducing or eliminating manual effort and errors in the authoring process.

Example System for Generating Output Meshes

FIG. 1 depicts an example system 100 for generating output meshes based on input meshes.

In the illustrated example, an input mesh 105 is provided as input to a mesh generation system 110. Although the illustrated example depicts the mesh generation system 110 accessing the input mesh 105 from an external location (e.g., from a component or storage external to the mesh generation system 110) for conceptual clarity, in embodiments, the input mesh 105 may be maintained internally by the mesh generation system 110. Generally, accessing the input mesh 105 can include receiving it, requesting it, retrieving it, or otherwise gaining access to it. For example, a user (e.g., a designer) may indicate or provide the input mesh 105 (e.g., providing the mesh itself, or providing a link or pointer to the storage location of the input mesh 105). In at least one embodiment, the user can provide or indicate the input mesh 105 using a graphical user interface (GUI), such as the GUI 112.

Although depicted as a discrete system for conceptual clarity, in some aspects, the operations of the mesh generation system 110 may be combined or distributed across any number of devices and systems. The mesh generation system 110 may generally be implemented using hardware, software, or a combination of hardware and software.

In one embodiment, the input mesh 105 is a three-dimensional computer model of cloth (also referred to in some aspects as a garment). For example, the input mesh 105 may comprise a modeled shirt, pants, cape, or other garment of a virtual character. Generally, the input mesh 105 includes one or more faces and one or more edges (where each edge is generally defined by two vertices). In some embodiments, the input mesh 105 is relatively simple or sparse (e.g., with a relatively low number of polygons), allowing it to be easily created and modified by the user. In some embodiments, though the input mesh 105 is a three-dimensional mesh (e.g., where the location of each vertex is defined in three-dimensional space), the mesh itself may have no thickness. That is, the input mesh 105 may comprise a single layer of faces, with no volume or thickness to the material.

In some embodiments, the input mesh 105 is a quad mesh (e.g., a mesh with quad polygons). In the illustrated example, the mesh generation system 110 uses the input mesh 105 to create a quad live mesh 115 and a quad decimated and smoothed mesh 125. The quad decimated and smoothed mesh 125 is generally a quad mesh representing the input mesh 105, but with reduced or simplified detail (e.g., it is "decimated") and added smoothing (e.g., using subdivision smoothing, where, for each vertex in the mesh, an average of neighboring vertices can be computed, and the vertex can be moved toward this computed average) to enable more accurate and efficient simulation of the material. As illustrated, this quad decimated and smoothed mesh 125 is then used to generate a triangular simulation mesh 130. The triangular simulation mesh is generally a triangulated mesh (e.g., a mesh with triangular polygons) that can be efficiently simulated. This allows the mesh generation system 110 (or another system) to simulate how elements such as gravity, wind, and movement affect the mesh (e.g., to simulate the movement of a character's shirt as they walk).

In an embodiment, the quad live mesh 115 is used to enable authoring or modifying the input mesh 105 and/or the quad render mesh 120. For example, as the quad live mesh 115 may correspond to or match the input mesh 105 (e.g., with the same number and arrangement of components, such as the same vertices, the same edges, the same faces, and the like), modifications to the quad live mesh 115 may be copied to the input mesh 105 in some aspects. The mesh generation system 110 may output the quad live mesh 115 (e.g., via the GUI 112) to allow users (e.g., designers) to modify it or otherwise interact with the mesh in order to shape the output render.

For example, as discussed below in more detail, users may use the GUI 112 to interact with the quad live mesh 115 to define cloth seams in the mesh, to specify thicknesses of various portions, to assign or generate attributes for various components of the quad live mesh 115, and the like. As illustrated, the mesh generation system 110 can use the quad live mesh 115 to generate a quad render mesh 120. As discussed above, the quad render mesh 120 is generally a quadrangular mesh (e.g., a mesh made of four-sided polygons). In some embodiments, the quad render mesh 120 is generated by tessellating the quad live mesh 115. For example, the quad render mesh 120 may generally include more faces than the input mesh 105 and/or quad live mesh 115, as the quad render mesh 120 may be generated by subdividing the faces of the input mesh 105 into multiple faces, thereby resulting in a denser mesh.

In some embodiments, as discussed in more detail below, the mesh generation system 110 may generate the quad render mesh 120 based at least in part on attributes or other labels provided by the user. For example, as discussed in more detail below with reference to FIG. 5, the user may specify or label one or more edges in the input mesh 105 and/or quad live mesh 115 as seams (along with various parameters such as seam depth, width, symmetry, and the like), and the mesh generation system 110 may automatically generate the seam in the quad render mesh 120. As another example, as discussed in more detail below with reference to FIG. 4, the user may specify or label one or more faces as having a non-zero thickness (e.g., a specified thickness, or a generated thickness, such as an automatically-generated value to taper across one or more faces from a user-defined thick edge to a default thickness of zero), and the mesh generation system 110 may automatically generate appropriate thickness in the quad render mesh 120.

In some embodiments, as discussed in more detail below, the mesh generation system 110 can further use various transfer operations (such as stochastic attribute transfer) to transfer any attributes of the input mesh 105 and/or quad live mesh 115 to the quad render mesh 120 and/or triangular simulation mesh 130. For example, as discussed in more detail below with reference to FIG. 6, the mesh generation system 110 may transfer face attributes by sampling points across the quad live mesh 115 and/or input mesh 105, and project these sampled points to the quad render mesh 120 and/or triangular simulation mesh 130. For each respective face in the quad render mesh 120 and/or triangular simulation mesh 130, the mesh generation system 110 can then count or identify the sampled points that land on, pass through, or are otherwise associated with the respective face. The mesh generation system 110 can then transfer attributes to the output mesh based on these points. As another example, as discussed in more detail below with reference to FIG. 7, the mesh generation system 110 may transfer edge attributes by generating artificial face sets and using the face transfer operation to identify the corresponding edge(s) in the output meshes.

In some embodiments, the mesh generation system 110 can then output the quad render mesh 120 and/or triangular simulation mesh 130 (e.g., via the GUI 112), allowing the user to review the resulting output meshes. Based on this output, the user may interact with the quad live mesh 115 and/or input mesh 105 (e.g., to modify the mesh itself, to change attribute assignments, and the like) in order to refine the output meshes. In some embodiments, the mesh generation system 110 can similarly facilitate use of the meshes (e.g., providing the quad render mesh 120 to a renderer, providing the triangular simulation mesh 130 to a simulator, and the like).

Example Workflow for Generating an Output Render Mesh Based on an Input Mesh

Figure 2:
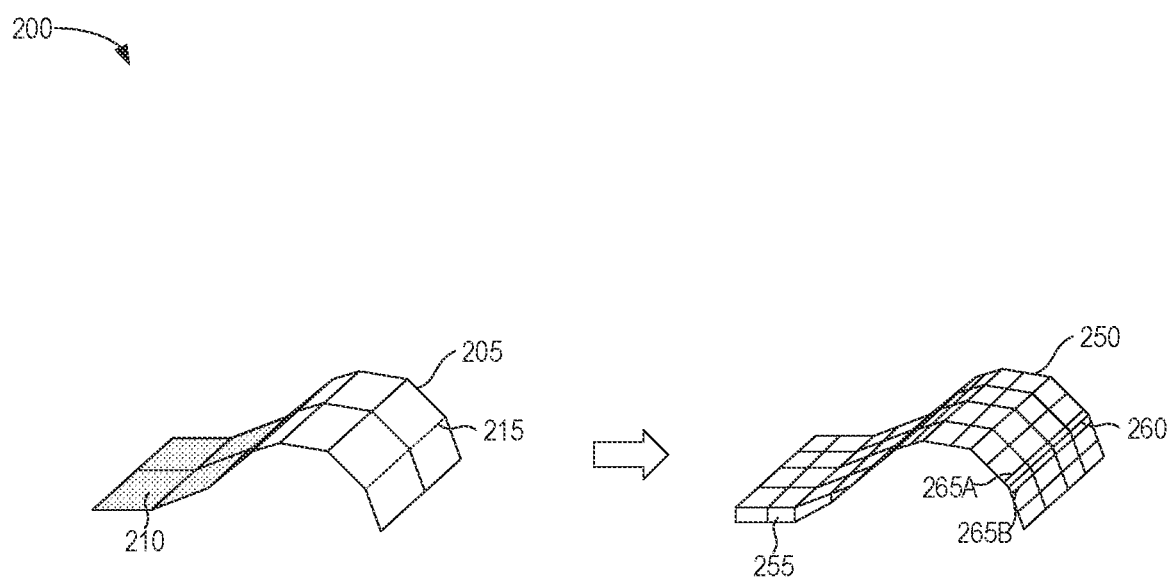
FIG. 2 depicts an example workflow for generating an output render mesh based on an input mesh.

FIG. 2 depicts an example workflow 200 for generating an output render mesh based on an input mesh. In some embodiments, the workflow 200 is performed by a mesh generation system, such as the mesh generation system 110 of FIG. 1.

In the illustrated embodiment, the mesh generation system processes an input mesh 205 to generate an output mesh 250. The input mesh 205 generally comprises a three-dimensional model of cloth (e.g., created by a user or designer), and the output mesh 250 is a computer-generated mesh used for various downstream purposes (e.g., a render mesh, a simulation mesh, and the like). For example, the input mesh 205 may correspond to the input mesh 105 and/or quad live mesh 115 of FIG. 1, and the output mesh 250 may correspond to the quad render mesh 120 of FIG. 1. In the illustrated example, the input mesh 205 and output mesh 250 are both quad meshes.

As illustrated, the input mesh 205 generally comprises a set of quad faces defined by a set of edges. The input mesh 205 can generally have any three-dimensional shape. In the depicted example, the input mesh 205 has a thickness of zero. That is, the input mesh 205 is effectively a single sheet of faces (each of which have zero thickness).

In the illustrated example, the input mesh 205 can have a variety of labels, attributes, or other associated data. For example, as indicated by a dashed line the edge 215 is designated as a seam edge. That is, when creating the output mesh 250, the mesh generation system will create a seam at the location of the edge 215. In some embodiments, a user may manually select edges (such as the edge 215) to be designated it as seams. For example, seams may be specified at any edges in the mesh that represent the seam or joint between two or more pieces of fabric (e.g., around the shoulder of a modeled shirt, where the arm fabric joins to the torso fabric).

As discussed in more detail below with reference to FIG. 5, when generating the output mesh 250, the mesh generation system generates the seam. As illustrated, the mesh generation system may duplicate the edge 215 to generate edges 265A and 265B, and translate these newly-created edges 265 and/or the edge 260 (which corresponds to the edge 215) to create the seam. For example, the mesh generation system may translate the edges 265 along a tangent to the surface of the mesh (e.g., towards or away from the edge 260, which acts as the center of the seam), along the mesh face), translate the edges 265 and/or 260 along the normal of the surface (e.g., inwards to create a sunken seam and/or outwards to create a bulging seam). In this way, the mesh generation system can automatically create seams in the output mesh 250 based on simple designations or input from the user (e.g., indicating where the seam should be located and/or specifying parameters of the seam, such as the width, depth, symmetry (e.g., whether one side is larger than the other), and the like).

As illustrated by stippling, the input mesh 205 further includes a set of faces 210 designated to have non-zero thickness in the output mesh 250. That is, rather than requiring that the user manually generate these thick faces or regions of the mesh, they can simply be labeled or assigned a thickness. For example, the user (or another system) may specify a thickness of one or more faces (e.g., indicating that it should be one centimeter thick, or some other unit of length). In some embodiments, one or more faces 210 may be designated as having a thickness defined based on the thickness of one or more surrounding faces. For example, the user may specify that a given face (or set of faces) should have a thickness in between the thicknesses of the faces on either side, allowing the mesh generation system to automatically generate an output mesh 250 that feathers down from the user-defined thickness at one end to a thickness of zero at the other. In at least one embodiment, the user can specify a thickness of one or more faces, and allow the mesh generation system to taper this thickness down to zero (either automatically, or based on user input, such as across a defined number of faces or a defined distance across the mesh).

In the illustrated example, as indicated by numeral 255, the output mesh 250 includes a non-zero thickness for the shaded set of faces 210 in the input mesh 205. Further, as illustrated, the thickness of the output mesh 250 tapers down to the default thickness of zero, rather than immediately dropping to zero. In this way, the mesh generation system can automatically generate output meshes 250 with non-zero thickness.

Using the workflow 200, the mesh generation system can thereby automatically generate output meshes 250 having additional detail not included in the input mesh 205. That is, the mesh generation system can generate more detailed output meshes 250 that include detail, components, or features that were not included in the input mesh 205 and were not manually-created. For example, the user may craft a relatively simple and non-dense input mesh 205 as a two-dimensional sheet, indicate which edge(s) correspond to seam(s), and/or indicate which face(s) should have a non-zero thickness. The mesh generation system can then automatically or procedurally generate the output mesh 250 with the appropriate detail. This can substantially improve the use and look of the output mesh 250 without requiring manual effort, thereby reducing the time needed to craft the mesh and improving the uniformity and appearance of the output mesh 250.

Although not included in the illustrated example, in some embodiments, the mesh generation system can additionally or alternatively perform one or more transfer techniques (e.g., a stochastic attribute transfer operation) to map attributes of the input mesh 205 to the output mesh 250, as discussed in more detail below.

Example Method for Generating Render Meshes Based on Input Meshes

Figure 3:
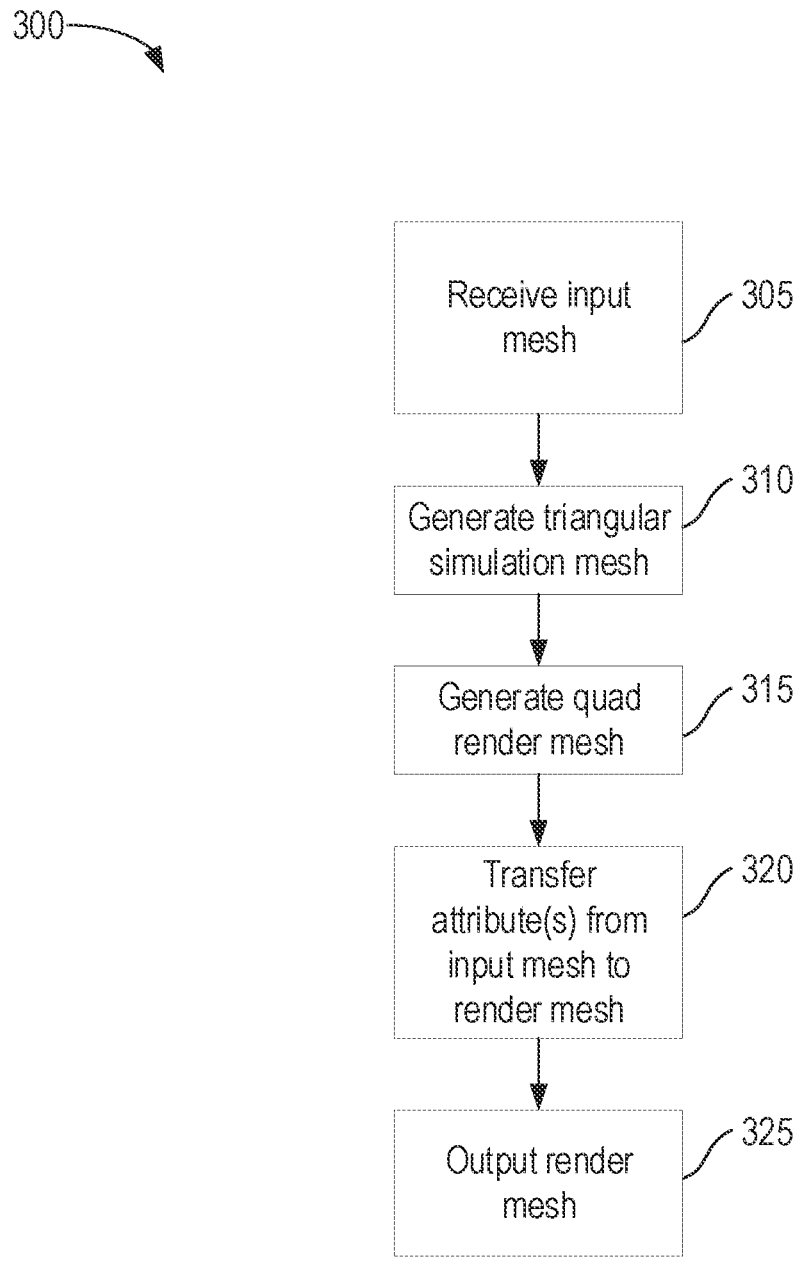
FIG. 3 is a flow diagram depicting an example method for generating render meshes based on input meshes.

FIG. 3 is a flow diagram depicting an example method 300 for generating render meshes based on input meshes. In some embodiments, the method 300 is performed by a mesh generation system, such as the mesh generation system 110 of FIG. 1.

At block 305, the mesh generation system receives an input mesh. As discussed above, the input mesh generally comprises a 3D model of a cloth material (e.g., a garment). For example, the received input mesh may correspond to the input mesh 105 of FIG. 1 and/or the input mesh 205 of FIG. 2. As discussed above, receiving the input mesh may generally include requesting it, retrieving it, or otherwise accessing the mesh.

At block 310, the mesh generation system can optionally generate a triangular simulation mesh. For example, as discussed above, the mesh generation system may generate a triangular mesh using triangulated tessellation (e.g., to generate the triangular simulation mesh 130 of FIG. 1). The simulation mesh can generally be used to perform physics simulation for the cloth represented by the input mesh (e.g., to simulate how it hangs and/or moves due to forces such as gravity, wind, movement, and the like).

At block 315, the mesh generation system generates a quad render mesh. For example, as discussed above, the mesh generation system may generate the quad mesh using quadrangulated tessellation (e.g., to generate the quad render mesh 120 of FIG. 1). The render mesh can generally be rendered to produce the final output (e.g., images) of the input mesh. For example, the simulation mesh may be used to simulate or define movement of the cloth, and the render mesh may be fit to these movements and rendered to produce the output imagery. In some embodiments, generating the render mesh can include procedurally adding detail, such as seams and/or thickness, as discussed in more detail below with reference to FIGS. 4 and 5.

Although the illustrated example suggests that the render mesh may be generated after the simulation mesh, in embodiments, the mesh generation system may generate the render mesh and simulation mesh entirely or substantially in parallel or simultaneously.

At block 320, the mesh generation system transfers one or more attributes from the input mesh to the render mesh. For example, as discussed below in more detail with reference to FIG. 6, the mesh generation system may use stochastic transfer to map attributes from faces of the input mesh to faces of the render mesh. Similarly, as discussed below in more detail with reference to FIG. 7, the mesh generation system may use a stochastic transfer technique to map attributes from edges in the input mesh to the edges in the render mesh. Although the illustrated example depicts transferring attributes to the render mesh, in some aspects, the mesh generation system can additionally or alternatively transfer attributes to the simulation mesh.

As used herein, transferring attributes from an input mesh to an output mesh may generally include transferring them from the original input (e.g., from the input mesh 105 of FIG. 1), as well as from a live mesh used in the mesh design process (e.g., from the quad live mesh 115 of FIG. 1). That is, the user may interact with the quad live mesh 115 to author attributes or characteristics (in addition to or instead of adding them to the input mesh 105), and the mesh generation system may generally transfer attributes from the input mesh 105 and/or quad live mesh 115 to the output mesh(es) (e.g., to the simulation mesh and/or render mesh).

At block 325, the mesh generation system outputs the render mesh. In embodiments, this output may include displaying it on a GUI (e.g., allowing the user to review and refine the mesh, such as by updating the render mesh directly, or by updating a live mesh such as the quad live mesh 115 of FIG. 1), rendering it to generate output images, and the like.

In this way, using the method 300, the mesh generation system can dynamically generate detailed quad render meshes that require reduced manual effort, improve appearance and use of the output mesh, and enable efficient rendering with reduced artifacts, as compared to conventional systems.

Example Method for Generating Cloth Thickness Geometry in Render Meshes

Figure 4:
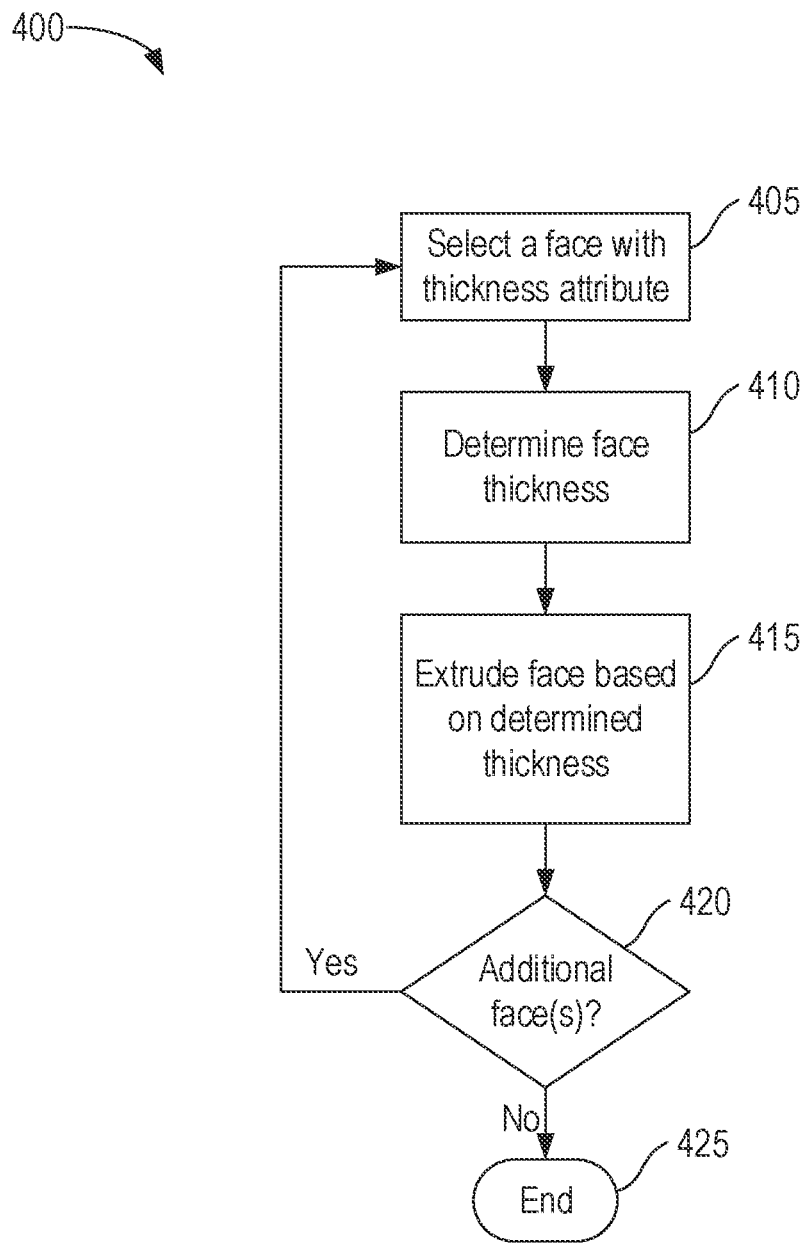
FIG. 4 is a flow diagram depicting an example method for generating cloth thickness geometry in render meshes.

FIG. 4 is a flow diagram depicting an example method 400 for generating cloth thickness geometry in render meshes. In some embodiments, the method 400 is performed by a mesh generation system, such as the mesh generation system 110 of FIG. 1. In some embodiments, the method 400 provides additional detail for block 315 of FIG. 3. In some embodiments, the method 400 is used to add face thickness after smoothing (if any) is applied to the output mesh. That is, the method 400 can be used to extrude faces to add thickness to faces of an unsmoothed mesh.

At block 405, the mesh generation system selects a face having a non-zero thickness label in an input mesh. That is, the mesh generation system can select a face in the input mesh that is designated or labeled as having a non-zero thickness. For example, a user may label the edge as having thickness, specify the thickness, and the like. In embodiments, the mesh generation system may select the face using any suitable techniques, as all faces designated as having thickness will be processed using the method 400. Although the illustrated example depicts a sequential process (iteratively selecting and each processing each thick face in turn) for conceptual clarity, in embodiments, the mesh generation system may select and process some or all of the faces in parallel.

At block 410, the mesh generation system determines the thickness of the selected face. For example, as discussed above, the user may manually specify or define the thickness of one or more edges (e.g., indicating that a given face should be one centimeter thick). In some embodiments, the mesh generation system determines the thickness of the selected face based on a tapering algorithm. For example, the mesh generation system may interpolate between the user-defined thickness of one face and the system-default thickness of zero on another face to define the appropriate thickness for a given face. As one example, the user may specify or control the taper (e.g., controlling how quickly the face thickness drops to zero), such as by using a weighted or feathered brush or tool when labeling the face(s) as having a defined thickness. The system can then automatically taper the thickness as desired.

At block 415, the mesh generation system extrudes the selected face based on the determined face thickness. For example, as discussed above with reference to FIG. 2, the mesh generation system may create a second face parallel to the selected face, and extrude it (e.g., translating it along the normal and connecting the duplicated face to the original face using a new set of faces in the mesh) by the desired thickness amount.

At block 420, the mesh generation system determines whether there is at least one additional face having a non-zero thickness remaining in the input mesh. If so, the method 400 returns to block 405. If not, the method 400 terminates at block 425. In this way, the mesh generation system can dynamically generate cloth having non-zero thickness in render meshes, thereby improving the detail and look of the output meshes without requiring substantial manual effort.

Example Method for Generating Seam Geometry in Render Meshes

Figure 5:
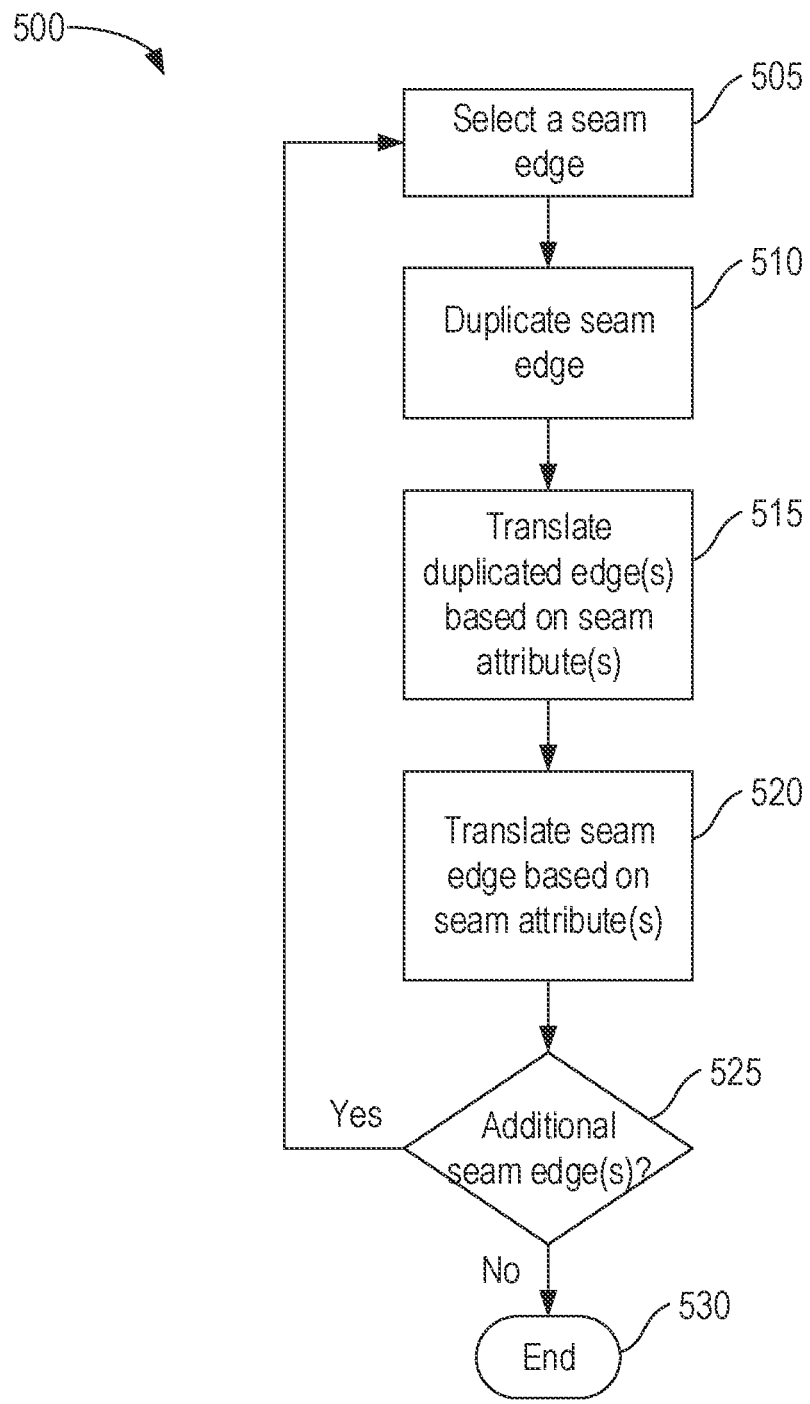
FIG. 5 is a flow diagram depicting an example method for generating seam geometry in render meshes.

FIG. 5 is a flow diagram depicting an example method 500 for generating seam geometry in render meshes. In some embodiments, the method 500 is performed by a mesh generation system, such as the mesh generation system 110 of FIG. 1. In some embodiments, the method 500 provides additional detail for block 315 of FIG. 3. In some embodiments, the method 500 is used to add seams after extrusion (if any) is applied. That is, the method 500 may be performed after the method 400 of FIG. 4 is used to add thickness to any relevant edges in the mesh. Further, in some embodiments, the method 500 is used to add seams after smoothing (if any) is applied to the output mesh. That is, the method 500 can be used to add seams to a smoothed output mesh.

At block 505, the mesh generation system selects a seam edge in an input mesh. That is, the mesh generation system can select an edge in the input mesh that is designated or labeled as a seam. For example, a user may label the edge as a seam. In embodiments, the mesh generation system may select the seam edge using any suitable techniques (including randomly or pseudo-randomly), as all edges designated as seams will be processed using the method 500. Although the illustrated example depicts a sequential process (iteratively selecting and each processing each seam edge in turn) for conceptual clarity, in embodiments, the mesh generation system may select and process some or all of the seam edges in parallel.

Although the illustrated example refers to a singular seam edge, it is to be understood that a seam edge may in fact correspond to a set of edges in the input mesh. That is, a set of connected edges may be jointly designated as a seam in the cloth model.

At block 510, the mesh generation system duplicates the selected seam edge. For example, as discussed above with reference to FIG. 2, the mesh generation system may generate two additional edges (e.g., edges 265A and 265B) to form the seam. In some embodiments, duplicating the seam comprises adding new edges in the mesh that match or correspond to the selected seam edge.

At block 515, the mesh generation system translates the duplicated edge(s) based on one or more seam attributes. For example, as discussed above, the user may specify attributes such as the seam width, the seam depth, the symmetry (or asymmetry) of the seam, and the like. In an embodiment, translating the duplicated edges includes translating them tangentially along the surface of the mesh. For example, as discussed above, one edge may be translated along the surface (e.g., along the face) away from the seam edge in a first direction, while the other edge is translated along the surface away from the seam edge in the other direction. In one embodiment, the amount of this translation is defined based on the seam width and/or symmetry parameters.

At block 520, the mesh generation system translates the selected seam edge based on one or more seam attributes. For example, as discussed above, the user may specify attributes such as the seam width, the seam depth, the symmetry (or asymmetry) of the seam, and the like. In an embodiment, translating the seam edge includes translating it along the normal from the surface of the mesh. For example, as discussed above, the seam edge may be translated along the normal (e.g., into the mesh to create an inset or sunken seam, or out of the mesh to create a raised seam). In one embodiment, the amount of this translation is defined based on the seam depth parameters.

At block 525, the mesh generation system determines whether there is at least one additional seam edge remaining in the input mesh. If so, the method 500 returns to block 505. If not, the method 500 terminates at block 530. In this way, the mesh generation system can dynamically generate cloth seams in render meshes, thereby improving the detail and look of the output meshes without requiring substantial manual effort.

Example Method for Stochastic Attribute Transfer on Mesh Faces

Figure 6:
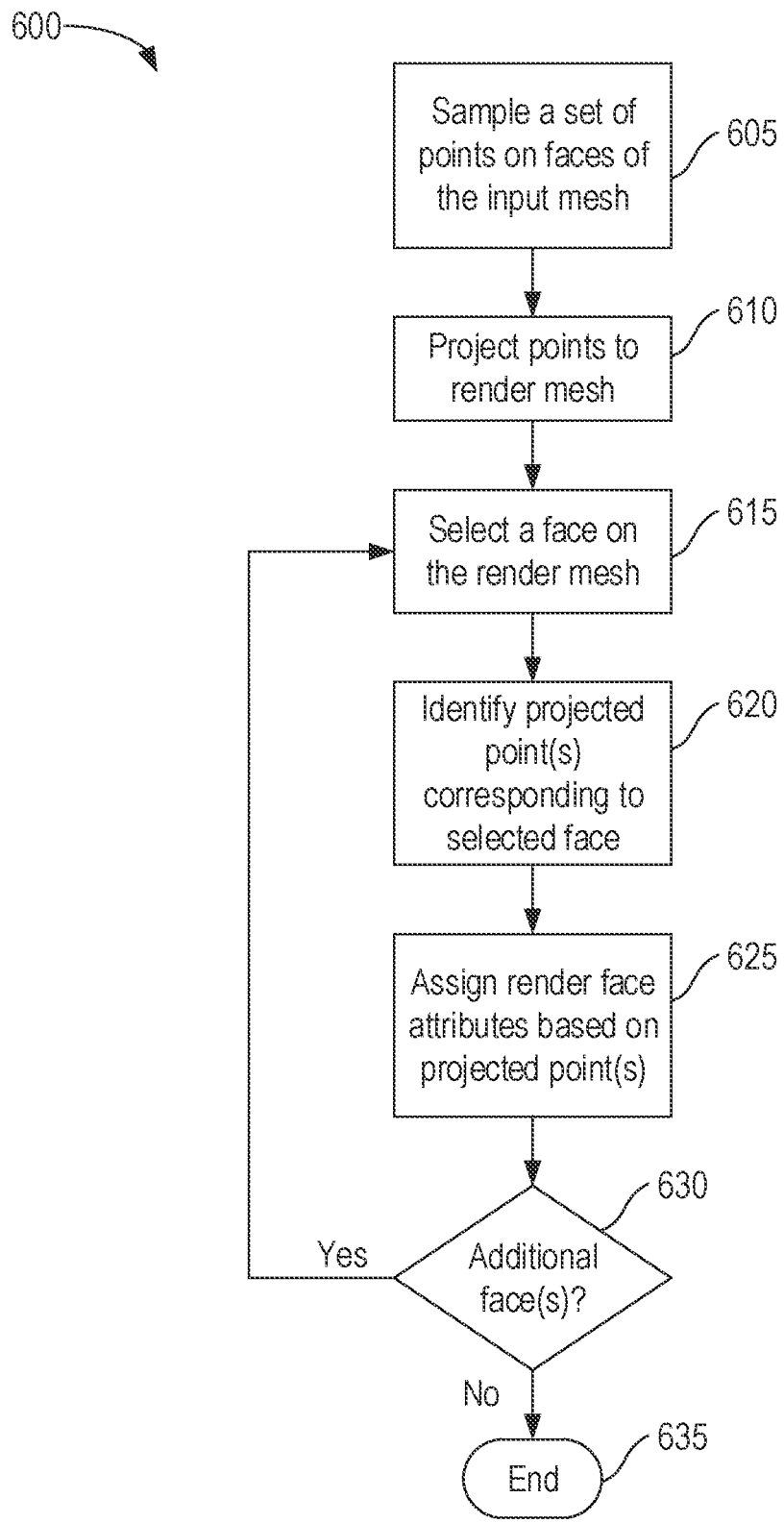
FIG. 6 is a flow diagram depicting an example method for stochastic attribute transfer on mesh faces.

FIG. 6 is a flow diagram depicting an example 600 method for stochastic attribute transfer on mesh faces. In some embodiments, the method 600 is performed by a mesh generation system, such as the mesh generation system 110 of FIG. 1. In some embodiments, the method 600 provides additional detail for block 320 of FIG. 3. Although the illustrated example discusses transfer of attributes to the render mesh for conceptual clarity, the method 600 can readily be used to transfer attributes from the input mesh to any output mesh (such as the simulation mesh).

At block 605, the mesh generation system samples a set of points on one or more faces of the input mesh (or a live mesh, as discussed above). In one embodiment, sampling the set of points includes using one or more sampling techniques to identify attribute(s) associated with faces of the input mesh. For example, the mesh generation system may use a random or pseudo-random process to scatter points across the faces of the input mesh. For each respective point, the mesh generation system can then determine the attribute(s) of the face on which the point lies. In this way, the mesh generation system can effectively generate a point cloud representing the mesh, where each point indicates the attributes of the mesh at the given point in the space.

In some embodiments, to sample points on the mesh, the mesh generation system first finds the face having the largest area on either mesh (e.g., the largest face on the input mesh or the largest face on the target or output mesh, whichever has greater area). The mesh generation system may then we define a sample density as sampleDensity=N/maxArea, where N is a user-defined parameter (e.g., twenty) and maxArea is the area of the largest face. This sample density indicates that the largest face will have N samples, while other (smaller) faces will have fewer samples (but with the same density).

In an embodiment, to sample each respective face on the input mesh, the mesh generation system then sets the sample count of the respective face to count=faceArea*sampleDensity and generate count samples stochastically (e.g., randomly) inside or on the respective face. Each of these sampled points is generally associated with the respective face (e.g., labeled to indicate the input face it corresponds to, and/or to indicate the attributes of the input face).

At block 610, the mesh generation system projects the sampled points to the render mesh. In one embodiment, to project the sampled points to the render mesh, the mesh generation system can project each sampled point to its corresponding closest point on the target/output mesh. That is, "projecting" a sampled point may include finding the closest point, on the output mesh, to the sampled point in three-dimensional space. In some embodiments, this closest-point projection can be efficiently computed using acceleration data structures such as a Bounded Volume Hierarchy (BVH).

At block 615, the mesh generation system selects a face on the render mesh. In embodiments, the mesh generation system may select the face using any suitable techniques (including randomly or pseudo-randomly), as all faces in the output mesh will be processed using the method 600. Although the illustrated example depicts a sequential process (iteratively selecting and each processing each face in turn) for conceptual clarity, in embodiments, the mesh generation system may select and process some or all of the faces in parallel.

At block 620, the mesh generation system identifies the projected sample points that correspond to the selected face. That is, the mesh generation system can find or determine the set of points (projected at block 610) that land on the selected face in the render mesh.

At block 625, the mesh generation system then assigns zero or more attributes to the selected render face based on the attributes indicated for the identified points. That is, for each respective point in the set of points that are associated with or correspond to the selected render face (identified at block 620), the mesh generation system can determine the respective face attribute(s) indicated by the respective point. The mesh generation system can then aggregate these attributes to define the attributes of the selected render face. In some embodiments, each point in the identified set of points serves as a vote towards the attributes of the render face.

For example, in one embodiment, the mesh generation system determines the set of attributes having the highest number of votes (e.g., the attribute(s) indicated by the majority or the plurality of the points in the identified set of points). This set of attributes can then be assigned to the render face. For example, the mesh generation system may determine the number of unique attribute sets (e.g., the number of different combinations of attributes reflected by the set of points, or the number unique face sets that have one or more sampled points projected to the selected face) that may be associated with the face. The mesh generation system can then identify which unique set of attributes has the most votes (e.g., the largest number of points) in the set. In some embodiments, the mesh generation system can aggregate the attributes, such as by determining the average or median. For example, for a numerical attribute such as weight of the material, the mesh generation system can determine the weight indicated by each point in the identified set, and average these values to determine the weight of the render face.

At block 630, the mesh generation system determines whether there is at least one additional face in the render mesh that has not-yet been evaluated to assign attributes. If so, the method 600 returns to block 615. If not, the method 600 terminates at block 635.

In this way, the mesh generation system can dynamically and automatically assign relevant attributes to the render mesh using stochastic transfer of attributes from the input mesh (e.g., using a densely-sampled point cloud to project the attributes). This allows the mesh generation system to automatically transfer attributes, substantially reducing manual effort, improving model accuracy, and facilitating creation and revision of the meshes.

Example Method for Stochastic Attribute Transfer on Mesh Edges

Figure 7:
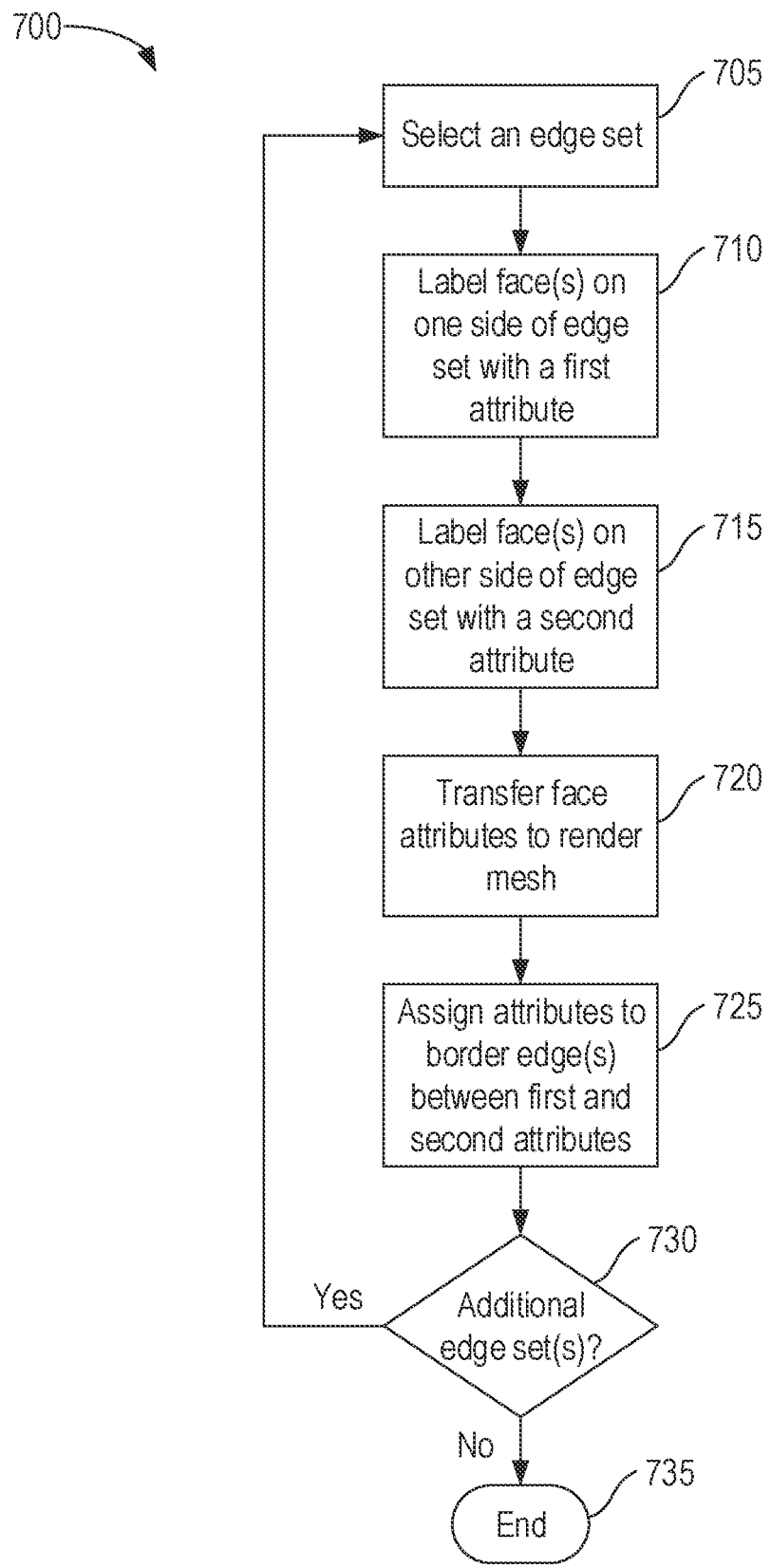
FIG. 7 is a flow diagram depicting an example method for stochastic attribute transfer on mesh edges.

FIG. 7 is a flow diagram depicting an example method 700 for stochastic attribute transfer on mesh edges. In some embodiments, the method 700 is performed by a mesh generation system, such as the mesh generation system 110 of FIG. 1. In some embodiments, the method 700 provides additional detail for block 320 of FIG. 3. In some embodiments, while the method 600 of FIG. 6 can be used to transfer attributes of mesh faces, the method 700 can be used to transfer attributes of mesh edges. Although the illustrated example discusses transfer of attributes to the render mesh for conceptual clarity, the method 700 can readily be used to transfer attributes from the input mesh to any output mesh (such as the simulation mesh).

At block 705, the mesh generation system selects an edge set in the input mesh (or in the live mesh, as discussed above). As used herein, an "edge set" refers to a set of one or more edges that are assigned to a single group or set and/or have the same attributes. For example, a user may designate a set of edges as an "edge set" to indicate that it delineates between two portions of the cloth model (e.g., as a seam). In an embodiment, when creating the render mesh and assigning attributes, the mesh generation system seeks to ensure that these edge sets are maintained (e.g., that the attributes specified for the edge set remain appropriately assigned to the edge set in the render mesh).

In embodiments, the mesh generation system may select the edge set using any suitable techniques (including randomly or pseudo-randomly), as all edge sets in the input mesh will be processed using the method 700. Although the illustrated example depicts a sequential process (iteratively selecting and each processing each edge set in turn) for conceptual clarity, in embodiments, the mesh generation system may select and process some or all of the edge sets in parallel.

At block 710, the mesh generation system labels all of the face(s) on one side of the selected edge set with a first artificial attribute (also referred to as a color in some aspects). That is, the mesh generation system can arbitrarily assign an attribute to the faces on one side of the edge set (e.g., on the left side), where this attribute is used to transfer the edge set attributes but does not otherwise affect the mesh (e.g., it is not authored by a user, and is not used for any downstream processing other than to transfer the edge attributes). In some embodiments, the mesh generation system labels all faces immediately adjacent to one side of the edge set. That is, the mesh generation system may identify the set of face(s) that are defined by one or more edges in the edge set (e.g., where the edges define the polygonal faces), and assign faces on one side of this edge set to the first attribute.

For example, the mesh generation system may identify all faces that connect to or are bordered by/adjacent to the edge set. The mesh generation system can then select one of these faces (e.g., randomly or pseudo-randomly) and assign the first artificial attribute to it. In one embodiment, the mesh generation system can then iteratively or recursively find all adjacent faces to the selected face (within the set of faces defined by the edge set), where adjacent faces are defined as those that share one or more edges that are not within the edge set. That is, faces that touch the edge set and also share at least one non-edge set edge with the selected face can be considered to be on the same "side" of the edge set. By recursively or iteratively finding each such adjacent face (and then finding adjacent faces to the identified adjacent face(s), and so on), the mesh generation system can find all faces on one side of the edge set. Any faces that touch the edge set but do not share any other non-edge set edges (e.g., they are only connected to the selected face through the edge set) may be classified as belonging to the "other" side of the edge set.

At block 715, the mesh generation system labels face(s) on the other side of the edge set with a second artificial or arbitrary attribute. In some embodiments, as discussed above, the mesh generation system labels the faces that are immediately adjacent to the edge set, on the other side of the edge as compared to those identified in block 710. As above, this artificial attribute can be arbitrarily assigned, where this attribute is used to transfer the edge set attributes but does not otherwise affect the mesh (e.g., it is not authored by a user, and is not used for any downstream processing other than to transfer the edge attributes).

At block 720, the mesh generation system transfers the assigned artificial/arbitrary face attributes to the render mesh. For example, as discussed above with reference to FIG. 6, the mesh generation system may use the method 600 to sample points on the faces of the input mesh, project these points to the render mesh, and assign the arbitrary attributes (assigned at block 710 and 715) to the render mesh faces based on the projected points (e.g., using a voting mechanism). In this way, the mesh generation system can identify which face(s) border the edge set in the render mesh.

At block 725, the mesh generation system assigns attribute(s) to border edges, in the render mesh, based on the transferred artificial attributes. In one embodiment, the mesh generation system may find the set of edges, in the render mesh, that border, delineate, or otherwise divide between the first and second artificial attributes in the render mesh. For example, given two sets of faces in the render mesh (e.g., those with the first artificial attribute and those with the second artificial attribute), the mesh generation system can find the set of edge(s) that border, touch, or connect to both sets (e.g., the edge(s) having a face belonging to one set of faces on one side, and a face belonging to the other set of faces on the other, or each edge that is shared by a respective pair of "left" and "right" faces in the output mesh).

Once this set of edges is identified, the mesh generation system can transfer or copy the edge set attributes from the input mesh to the identified edges in the render mesh. This allows the mesh generation system to efficiently and accurately map or transfer edge attributes to the render mesh.

At block 730, the mesh generation system determines whether there is at least one additional edge set in the input mesh that has not-yet been evaluated to transfer attributes to the render mesh. If so, the method 700 returns to block 705. If not, the method 700 terminates at block 735.

In this way, the mesh generation system can dynamically and automatically assign relevant attributes to the edges of the render mesh using stochastic transfer of attributes from the input mesh (e.g., using artificial face attributes and a densely-sampled point cloud to project these face attributes, and thereafter finding relevant edges in the render mesh). This allows the mesh generation system to automatically transfer attributes, substantially reducing manual effort, improving model accuracy, and facilitating creation and revision of the meshes.

Example Method for Generating Render Meshes

Figure 8:
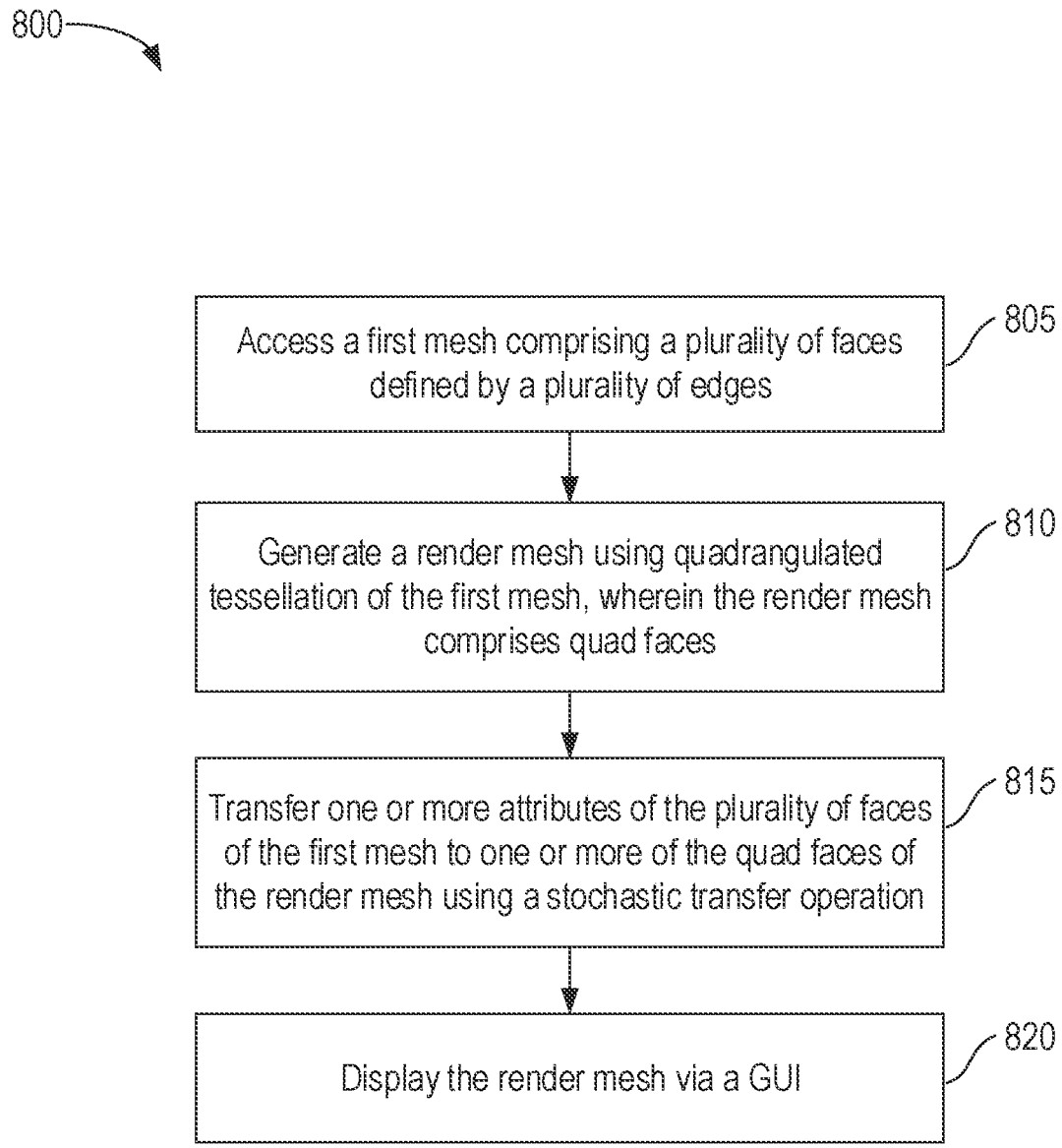
FIG. 8 is a flow diagram depicting an example method for generating render meshes.

FIG. 8 is a flow diagram depicting an example method 800 for generating render meshes. In some embodiments, the method 800 is performed by a mesh generation system, such as the mesh generation system 110 of FIG. 1.

At block 805, a first mesh (e.g., the input mesh 105 of FIG. 1) comprising a plurality of faces defined by a plurality of edges is accessed.

At block 810, a render mesh (e.g., the quad render mesh 120 of FIG. 1) is generated using quadrangulated tessellation of the first mesh, wherein the render mesh comprises quad faces.

At block 815, one or more attributes of the plurality of faces of the first mesh are transferred to one or more of the quad faces of the render mesh using a stochastic transfer operation.

At block 820, the render mesh is displayed via a GUI (e.g., the GUI 112 of FIG. 1).

Example Computing Device for Generating Output Meshes

Figure 9:
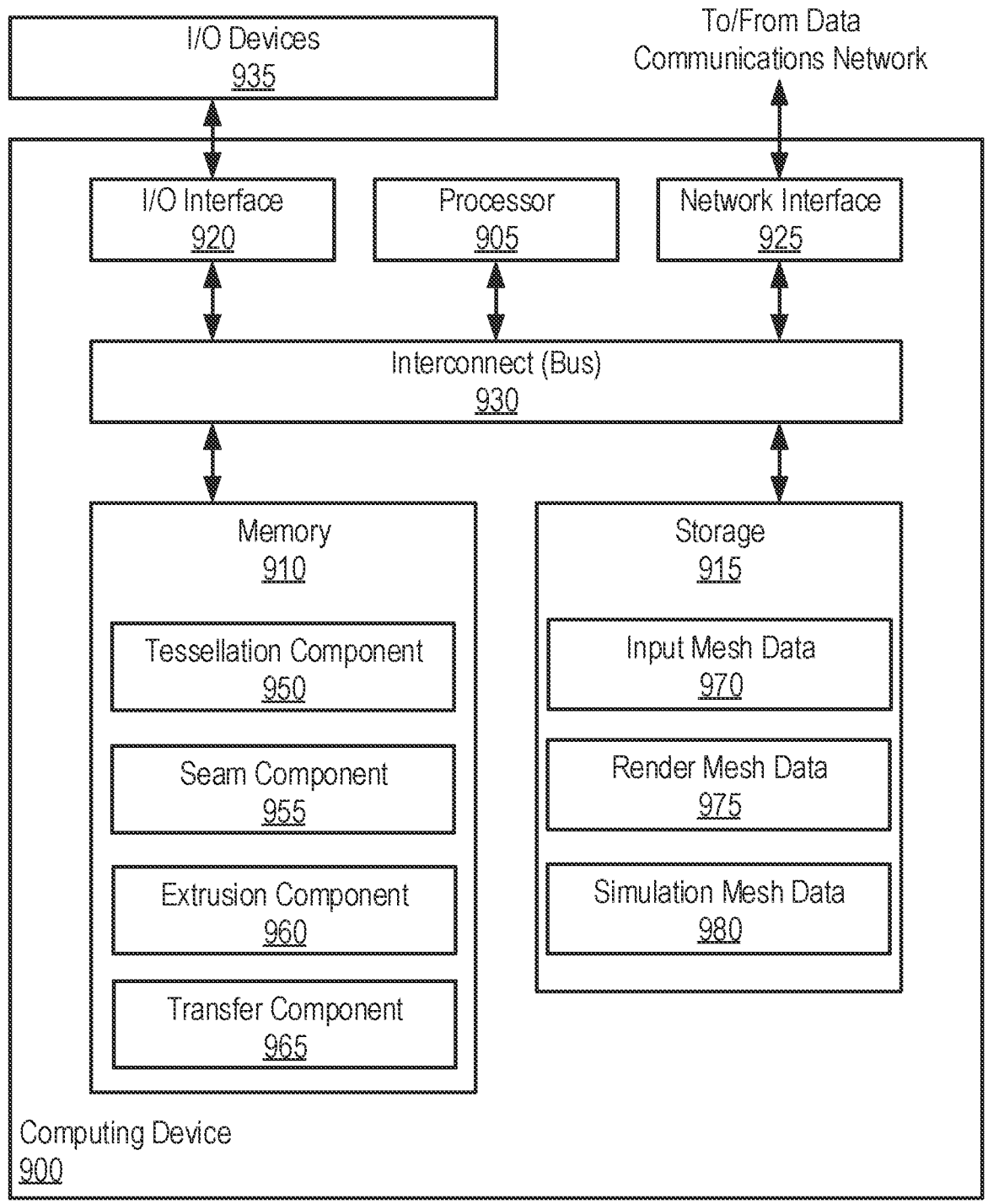
FIG. 9 depicts an example computing device configured to perform various aspects of the present disclosure.

FIG. 9 depicts an example computing device 900 configured to perform various aspects of the present disclosure. In one embodiment, the computing device 900 is a mesh generation system, such as mesh generation system 110 of FIG. 1. Although depicted as a physical device, in embodiments, the computing device 900 may be implemented as a virtual device or service, or across a number of devices (e.g., in a cloud environment). As illustrated, the computing device 900 includes a processor 905, memory 910, storage 915, I/O interface 920, and a network interface 925. In the illustrated embodiment, the processor 905 retrieves and executes programming instructions stored in memory 910, as well as stores and retrieves application data residing in storage 915. The processor 905 is generally representative of a single CPU, a GPU, a CPU and a GPU, multiple CPUs, multiple GPUs, a single CPU or GPU having multiple processing cores, and the like. The memory 910 is generally included to be representative of a random access memory. Storage 915 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, I/O devices 935 (such as a mouse, a keyboard, a monitor, a touchscreen, a GUI, etc.) are connected via the I/O Interface(s) 920. Further, via the network interface 925, the computing device 900 can be communicatively coupled with one or more other devices and components (directly or indirectly), such as content servers, via one or more networks.

As illustrated, the memory 910 includes a tessellation component 950, seam component 955, extrusion component 960, and transfer component 965. Although depicted as software residing in memory, in embodiments, the functionality of the depicted components (and others not depicted) may be implemented using hardware, software, or a combination of hardware and software. In some embodiments, the memory 910 may be used to temporarily store the depicted components while the processor 905 executes the instructions of each during runtime. In some aspects, the components may otherwise reside in another location, such as in storage 915.

The depicted components are generally configured to perform one or more embodiments disclosed herein. For example, in one embodiment, the tessellation component 950 is used to generate output meshes (e.g., a simulation mesh such as the triangular simulation mesh 130 of FIG. 1 and/or a render mesh such as the quad render mesh 120 of FIG. 1) based on input meshes. For example, the tessellation component 950 may use quadrangulated tessellation to generate quad render meshes, and/or triangulated tessellation to generate triangular simulation meshes.

The seam component 955 may automatically generate seams in render meshes based on edge attributes, as discussed above. For example, as discussed above with reference to FIG. 5, the seam component 955 may identify edges labeled as seams (e.g., by a user), duplicate such edges, and/or translate the edge(s) to generate a seam in the output mesh.

The extrusion component 960 may automatically generate cloth thickness in render meshes based on face attributes, as discussed above. For example, as discussed above with reference to FIG. 4, the extrusion component 960 may identify faces that are assigned a non-zero thickness, and extrude them appropriately to create thickness in the output mesh.

The transfer component 965 may automatically transfer or map attributes from input meshes onto output meshes (e.g., render meshes and/or simulation meshes). For example, as discussed above with reference to FIGS. 6 and 7, the transfer component 965 may use stochastic transfer operations to sample points on the input mesh, project these points to the output mesh, and assign attributes to the output mesh based on the sampled and projected points.

In the illustrated embodiment, the storage 915 includes input mesh data 970, render mesh data 975, and simulation mesh data 980. Though depicted as residing in storage 915 for conceptual clarity, in embodiments, the input mesh data 970, render mesh data 975, and simulation mesh data 980 may reside in any suitable location. The input mesh data 970 generally corresponds to 3D computer models of cloth materials (e.g., garments), such as a cloth material created or authored by a modeler or designer. In at least one embodiment, the input mesh data 970 corresponds to the input mesh 105 of FIG. 1.

The render mesh data 975 (which may correspond to the quad render mesh 120) generally corresponds to an automatically or procedurally generated mesh, created based on the input mesh data 970, which is intended for rendering, as discussed above. For example, the render mesh data 975 may be a quad mesh having relatively more components (e.g., additional faces) than the input mesh data 970, as well as relatively more detail (e.g., with added seams and thickness).

The simulation mesh data 980 (which may correspond to the triangular simulation mesh 130) generally corresponds to an automatically or procedurally generated mesh, created based on the input mesh data 970, which is intended for simulation, as discussed above. For example, the simulation mesh data 980 may be a triangular mesh having relatively more components (e.g., additional faces) than the input mesh data 970.

Additional Considerations

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   accessing a first mesh comprising a plurality of faces defined by a plurality of edges;
   generating a render mesh using tessellation of the first mesh, wherein the render mesh comprises quad faces;
   transferring one or more attributes of one or more faces of the plurality of faces of the first mesh to one or more of the quad faces of the render mesh using a first stochastic transfer operation; and
   transferring one or more attributes of one or more edges of the plurality of edges of the first mesh to one or more edges of the render mesh using a second stochastic transfer operation.

2. The method of claim 1, wherein the first stochastic transfer operation comprises:
   sampling a plurality of points on the plurality of faces of the first mesh to assign one or more attributes to one or more points of the plurality of points;
   projecting the plurality of points to the render mesh;
   identifying, for at least a first face in the render mesh, a first subset of points from the projected plurality of points associated with the first face; and
   assigning one or more attributes to the first face based on the first subset of points.

3. The method of claim 1, wherein the second stochastic transfer operation comprises:

assigning a first attribute to one or more faces on a first side of a first edge of the plurality of edges; and
assigning a second attribute to one or more faces on a second side of the first edge, opposite to the first side.

4. The method of claim 3, wherein the second stochastic transfer operation further comprises:
   sampling a plurality of points on the plurality of faces of the first mesh to assign the first attribute to one or more points of the plurality of points and the second attribute to one or more points of the plurality of points;
   projecting the plurality of points to the render mesh;
   assigning the first attribute to a first face in the render mesh based on a first subset of points, from the projected plurality of points, that is associated with the first face;
   assigning the second attribute to a second face in the render mesh based on a second subset of points, from the projected plurality of points, that is associated with the second face; and
   in response to determining that an edge in the render mesh borders the first and second faces, assigning one or more attributes of the first edge of the plurality of edges to the edge in the render mesh.

5. The method of claim 1, further comprising:
   determining that a first edge, of the plurality of edges in the first mesh, is labeled as a seam;
   duplicating the first edge to form a set of new edges in the render mesh; and
   translating at least one of the set of new edges to form the seam in the render mesh.

6. The method of claim 5, wherein determining that the first edge is labeled as a seam further comprises identifying a set of seam parameters comprising at least one of:
   a width of the seam;
   a normal offset of the seam; or
   a symmetry of the seam.

7. The method of claim 1, further comprising:
   determining that a first face, of the plurality of faces in the first mesh, is labeled with a defined thickness; and
   extruding the first face to form a set of new faces in the render mesh.

8. The method of claim 1, further comprising generating a simulation mesh based on the first mesh.

9. The method of claim 1, further comprising displaying the render mesh via a graphical user interface (GUI).

10. A non-transitory computer-readable medium containing computer program code that, when executed by operation of one or more computer processors, performs an operation comprising:
    accessing a first mesh comprising a plurality of faces defined by a plurality of edges;
    generating a render mesh using tessellation of the first mesh, wherein the render mesh comprises quad faces;
    determining that a first edge, of the plurality of edges in the first mesh, is labeled as a seam;
    generating a set of new edges, corresponding to the first edge, in the render mesh;
    translating at least one edge of the set of new edges based on the seam; and
    transferring one or more attributes of one or more faces of the plurality of faces of the first mesh to one or more of the quad faces of the render mesh using a stochastic transfer operation.

11. The non-transitory computer-readable medium of claim 10, wherein the stochastic transfer operation comprises:

sampling a plurality of points on the plurality of faces of the first mesh to assign one or more attributes to one or more points of the plurality of points;

projecting the plurality of points to the render mesh;

identifying, for at least a first face in the render mesh, a first subset of points from the projected plurality of points associated with the first face; and assigning one or more attributes to the first face based on the first subset of points.

12. The non-transitory computer-readable medium of claim 10, the operation further comprising transferring one or more attributes of the plurality of edges of the first mesh to one or more edges of the render mesh using a second stochastic transfer operation.

13. The non-transitory computer-readable medium of claim 12, wherein the second stochastic transfer operation comprises:

assigning a first attribute to one or more faces on a first side of a first edge of the plurality of edges; and assigning a second attribute to one or more faces on a second side of the first edge, opposite to the first side.

14. The non-transitory computer-readable medium of claim 10, the operation further comprising:

determining that a first face, of the plurality of faces in the first mesh, is labeled with a defined thickness; and extruding the first face to form a set of new faces in the render mesh.

15. The non-transitory computer-readable medium of claim 10, the operation further comprising displaying the render mesh via a graphical user interface (GUI).

16. A system, comprising:

a memory comprising computer-executable instructions; and one or more processors configured to execute the computer-executable instructions and cause the system to perform an operation comprising:

accessing a first mesh comprising a plurality of faces defined by a plurality of edges;

generating a render mesh using tessellation of the first mesh, wherein the render mesh comprises quad faces;

determining that a first face, of the plurality of faces in the first mesh, is labeled with a thickness;

generating a set of new faces in the render mesh based on applying an extrusion corresponding to the first face; and transferring one or more attributes of the plurality of faces of the first mesh to one or more of the quad faces of the render mesh using a stochastic transfer operation.

17. The system of claim 16, wherein the stochastic transfer operation comprises:

sampling a plurality of points on the plurality of faces of the first mesh to assign one or more attributes to one or more points of the plurality of points;

projecting the plurality of points to the render mesh;

identifying, for at least a first face in the render mesh, a first subset of points from the projected plurality of points associated with the first face; and assigning one or more attributes to the first face based on the first subset of points.

18. The system of claim 16, the operation further comprising transferring one or more attributes of the plurality of edges of the first mesh to one or more edges of the render mesh using a second stochastic transfer operation, wherein the second stochastic transfer operation comprises:

assigning a first attribute to one or more faces on a first side of a first edge of the plurality of edges; and assigning a second attribute to one or more faces on a second side of the first edge, opposite to the first side.

19. The system of claim 16, the operation further comprising:

determining that a first edge, of the plurality of edges in the first mesh, is labeled as a seam;

duplicating the first edge to form a set of new edges in the render mesh; and translating at least one of the set of new edges to form the seam in the render mesh.

20. The system of claim 16, the operation further comprising displaying the render mesh via a graphical user interface (GUI).

* * * * *